(12) United States Patent
Lialiamou et al.

(10) Patent No.: US 8,345,676 B2
(45) Date of Patent: Jan. 1, 2013

(54) METHOD FOR CHARGING OF DATA REACHING A NETWORK ELEMENT OF A COMMUNICATION NETWORK DURING A DATA SESSION

(75) Inventors: Elena Lialiamou, Pireaus (GR); Marco Stura, Rueglio (IT); Juha-Pekka Koskinen, Hämeenlinna (FI); Anne Narhi, Tampere (FI)

(73) Assignee: Nokia Corporation, Espoo (FI)

( * ) Notice: Subject to any disclaimer, the term of this patent is extended or adjusted under 35 U.S.C. 154(b) by 360 days.

(21) Appl. No.: 10/528,402

(22) PCT Filed: Sep. 20, 2002

(86) PCT No.: PCT/IB02/03877
§ 371 (c)(1),
(2), (4) Date: Apr. 6, 2005

(87) PCT Pub. No.: WO2004/036890
PCT Pub. Date: Apr. 29, 2004

(65) Prior Publication Data
US 2006/0050711 A1 Mar. 9, 2006

(51) Int. Cl.
*H04L 12/28* (2006.01)
(52) U.S. Cl. ........ 370/389; 370/474; 370/475; 370/252; 370/253; 455/405; 455/406
(58) Field of Classification Search ............ 370/410, 370/253, 351, 252, 400, 426, 310–350, 389, 370/475; 709/200, 241, 227; 455/405–409
See application file for complete search history.

(56) References Cited

U.S. PATENT DOCUMENTS

| | | | |
|---|---|---|---|
| 5,982,754 A * | 11/1999 | Itou et al. | 370/253 |
| 6,336,129 B1 * | 1/2002 | Ise et al. | 709/201 |
| 6,650,640 B1 * | 11/2003 | Muller et al. | 370/392 |

(Continued)

FOREIGN PATENT DOCUMENTS

| | | |
|---|---|---|
| AU | 2000236696 B2 | 10/2001 |
| WO | WO 99/65186 | 12/1999 |
| WO | WO 01/69891 | 9/2001 |
| WO | WO 01/78317 A1 | 10/2001 |

OTHER PUBLICATIONS

Patent Abstracts of Japan, vol. 2000, No. 13, Feb. 5, 2001, & JP 2000-286842, Oct. 13, 2000.

(Continued)

*Primary Examiner* — Kwang B Yao
*Assistant Examiner* — Kenan Cehic
(74) *Attorney, Agent, or Firm* — Alston & Bird LLP (57) ABSTRACT

Embodiments of the invention provide a method and device for charging of data reaching a network element of a communication network during a data session, the data session comprising a plurality of data flows, with each flow being distinguishable by a set of flow parameters. The method includes enforcing a charging policy at the network element to be applied to the data, wherein the charging policy defines charging rules per flow, observing the data reaching the network element and detecting at least one flow of data, matching the detected flow of data to an enforced charging policy, and applying the matching charging policy to the data flow, thereby generating charging information. A method and device is also provided for supplying a network element with a charging policy to be enforced at the network element for charging of data reaching the network element of a communication network during a data session.

25 Claims, 3 Drawing Sheets

U.S. PATENT DOCUMENTS

| | | | | |
|---|---|---|---|---|
| 6,854,014 | B1* | 2/2005 | Amin et al. | 709/227 |
| 6,947,535 | B2* | 9/2005 | Ginzboorg et al. | 379/201.01 |
| 7,002,922 | B1* | 2/2006 | Shigenari et al. | 370/253 |
| 7,002,977 | B1* | 2/2006 | Jogalekar | 370/410 |
| 7,185,073 | B1* | 2/2007 | Gai et al. | 709/221 |
| 7,342,886 | B1* | 3/2008 | Srinivasan et al. | 370/235 |
| 7,369,541 | B2* | 5/2008 | Hundscheidt et al. | 370/352 |
| 2002/0013849 | A1* | 1/2002 | Schweitzer et al. | 709/227 |
| 2002/0122432 | A1* | 9/2002 | Chaskar | 370/466 |
| 2002/0152319 | A1* | 10/2002 | Amin et al. | 709/232 |
| 2003/0074312 | A1* | 4/2003 | White | 705/40 |
| 2003/0152039 | A1* | 8/2003 | Roberts | 370/255 |
| 2006/0058006 | A1* | 3/2006 | Hurtta et al. | 455/405 |

OTHER PUBLICATIONS

Patent Abstracts of Japan, vol. 2002, No. 08, Aug. 5, 2002 & JP 2002 111910 A, Apr. 12, 2002.

Patent Abstracts of Japan, vol. 2000, No. 26, Jul. 1, 2002 & JP 2001 256589, Sep. 21, 2001.

International Search Report for International Application No. PCT/IB02/03877 mailed May 26, 2003.

International Preliminary Report on Patentability for International Application No. PCT/IB2002/003877 completed Jun. 15, 2004.

* cited by examiner

METHOD FOR CHARGING OF DATA REACHING A NETWORK ELEMENT OF A COMMUNICATION NETWORK DURING A DATA SESSION

FIELD OF THE INVENTION

The present invention relates to a method for charging of data reaching a network element of a communication network during a data session, and correspondingly to a method for supplying a network element with a charging policy to be enforced at said network element for charging of data reaching said network element of a communication network during a data session.

BACKGROUND OF THE INVENTION

Recently, communication networks have penetrated more and more in every day life and are adopted by subscribers for more and more services such as phone calls, data transmission and the like. Also, so-called value added services are implemented using communication networks.

With the increasing number of possible services available for subscription in communication networks, also new network types and/or subnetworks are emerging, while interoperability therebetween is still given.

In view of this variety of services to be subscribed and different networks/subnetworks used by subscribers when using their terminals, network operators are facing challenges in implementing new value added services based on messaging applications over e.g. GPRS (General Packet Radio Services).

With the increasing variety of services and the different qualities of services a subscriber can subscribe to, charging and/or billing for services offered by the network and used by the subscriber becomes rather complex.

Therefore, in this connection a new type of mediation functionality for charging is needed, which is capable of coping with additional requirements related to managing prepaid challenges, controlling charging logic based on context and processing capabilities of collected charging information.

SUMMARY OF THE INVENTION

Consequently, according to an aspect of the present invention, it is an object of the present invention to provide an improved method for charging of data reaching a network element of a communication network during a data session.

In addition, according to a further aspect of the present invention, it is an object of the present invention to provide an improved method for supplying a network element with a charging policy to be enforced at said network element for charging of data reaching said network element of a communication network during a data session.

According to an aspect of the present invention, the above object is for example achieved by a method for charging of data reaching a network element of a communication network during a data session, the data session comprising a plurality of data flows, with each flow being distinguishable by a set of flow parameters, the method comprising the steps of: enforcing a charging policy at the network element to be applied to said data, wherein said charging policy defines charging rules per flow; observing said data reaching said network element and detecting at least one flow of data; and matching said detected flow of data to an enforced charging policy, applying said matching charging policy to said flow, thereby generating charging information.

According to favorable further developments of the method,
   the method comprises a step of forwarding said generated charging information to a charging system of the communication network;
   enforcing is performed upon start-up of the network element;
   enforcing is performed upon activation of the data session;
   enforcing is performed dynamically during the life-time of the data session;
   upon enforcing said charging policy, data volume counters and/or time counters are initialized.
   said data flows are Internet Protocol based packet data flows, and said flow parameters comprise at least one of an IP header field, a transport header field, and an application level information;
   said charging policy comprises at least one flow parameter, and at least one of a charging/accounting type, an accounting event trigger, a charging metrics, and a tariffing indication;

According to a further aspect of the present invention, the above object is for example achieved by a method for supplying a network element with a charging policy to be enforced at said network element for charging of data reaching said network element of a communication network during a data session, the method comprising the step of: creating a plurality of charging policies, each comprising at least one flow parameter, and at least one of a charging/accounting type, an accounting event trigger, a charging metrics, and a tariffing indication, selecting a charging policy based on offered services and subscriber information, and distributing said selected charging policy to at least one network element.

According to favorable further developments of the method,
   a charging policy is selected for a type of a network element.

Furthermore, according to the present invention, the above objects are for example achieved by a device for charging of data reaching a network element of a communication network during a data session, the data session comprising a plurality of data flows, with each flow being distinguishable by a set of flow parameters,
the system comprising: enforcing means adapted to enforce a charging policy at the network element to be applied to said data, wherein said charging policy defines charging rules per flow; observation means adapted to observe said data reaching said network element and detecting at least one flow of data; and matching means adapted to match said detected flow of data to an enforced charging policy, application means adapted to apply said matching charging policy to said flow, and generation means, responsive to said application means, adapted to generate charging information.
   According to favorable further developments:
   the device further comprises forwarding means adapted to forward said generated charging information to a charging system of the communication network;
   said enforcing means are responsive to a start-up of the network element to perform the enforcing;
   said enforcing means are responsive to activation of the data session to perform the enforcing;
   said enforcing means are dynamically performing the enforcing during the life-time of the data session;

the device further comprises initialization means adapted to initialize data volume counters and/or time counters responsive to enforcing said charging policy;

said data flows are Internet Protocol based packet data flows, and said flow parameters comprise at least one of an IP header field, a transport header field, and an application level information;

said charging policy comprises at least one flow parameter, and at least one of a charging/accounting type, an accounting event trigger, a charging metrics, and a tariffing indication.

Furthermore, according to the present invention, the above objects are for example achieved by a device for supplying a network element with a charging policy to be enforced at said network element for charging of data reaching said network element of a communication network during a data session, the device comprising creation means adapted to create a plurality of charging policies, each comprising at least one flow parameter, and at least one of a charging/accounting type, an accounting event trigger, a charging metrics, and a tariffing indication, selection means adapted to select a charging policy based on offered services and subscriber information, and distribution means adapted to distribute said selected charging policy to at least one network element.

According to favorable further developments a charging policy is selected for a type of a network element.

By virtue of the present invention, which proposes a generally improved method for charging of data reaching a network element of a communication network during a data session and an improved method for supplying a network element with a charging policy to be enforced at said network element for charging of data reaching said network element of a communication network during a data session, basically the following advantages can be achieved access charges are based on metering of data sessions, which may contain several flows, which in turn may be charged differently, e.g. reverse charged, free of charge;

charging end user (subscriber) for services provided directly by third parties while also differentiating charges for the access bearer;

provisioning of charging logic and control of the proper real time metering and accounting mechanism differently per each flow of a specific service type.

BRIEF DESCRIPTION OF THE DRAWINGS

In the following, the present invention will be described in greater detail with reference to the accompanying drawings, in which.

DETAILED DESCRIPTION OF THE EMBODIMENTS

In brief, with the proposed charging mediation functionality, through a policy management interface the operator is allowed to create and manage charging policies. A charging policy decision logical function selects the appropriate charging policy according to the offered services and relevant subscription information. Via the charging policy control interface, the charging policy is sent to one or more network elements where it is locally enforced to relevant processes. Charging policies for access network devices such as GGSN are being considered but it can also apply to other network elements depending on the relevant needs such as core network elements, as will be set out in greater detail herein below.

In order to create charging policies for access network devices, a flow definition such as an IP flow definition is required. An IP flow, or any other flow which need not necessarily be based on the Internet Protocol IP, is a set of packets passing an observation point in the network during a certain time interval A set of IP flows (one or more) can correspond to the usage of a certain application or service differing from an application flow. There are services which use single IP flow or services which use more than one IP flows such as for example streaming or rich call. All packets belonging to a particular flow have a set of common properties derived from the data contained in the packet and from the packet treatment at the observation point. In the GPRS or 3G networks, the observation point can be a Gateway GPRS Support Node GGSN with additional capabilities. Packets are mapped to flows by evaluating their properties. Packets with common properties are considered to belong to the same flow. A packet showing at least one difference in the set of properties is considered to belong to a different flow. Depending on the specific case, only a subset of the properties could be used to distinguish flows or else extra parameters such as application level information (e.g. Uniform Resource Locator URL) may be required to distinguish application data flows (consisting of one or more IP flows)

Figure 1:
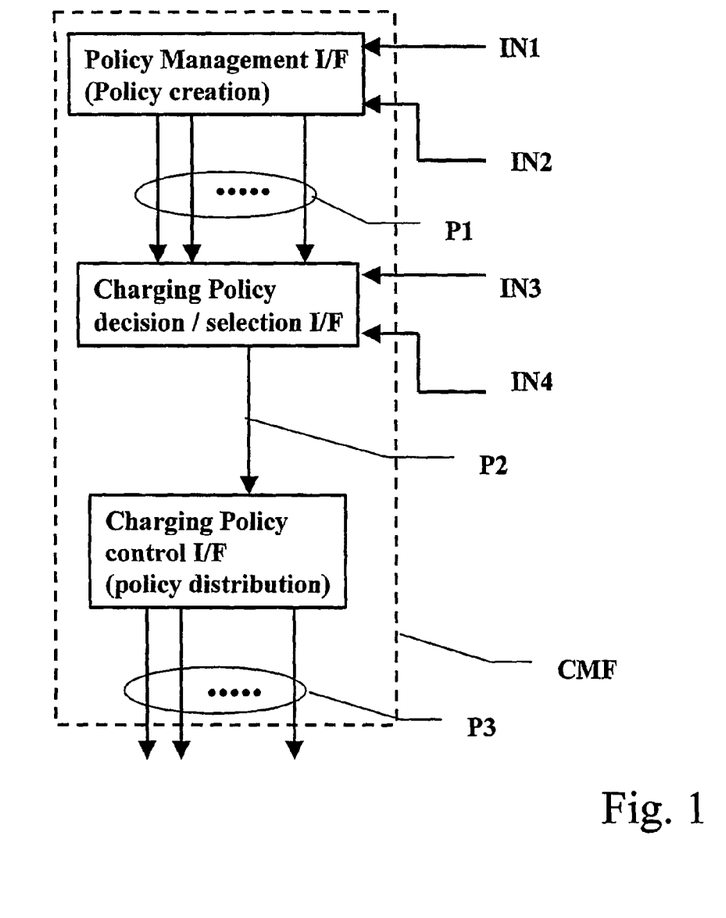
FIG. 1 shows in schematic outline the functionalities and steps involved in the method for supplying a network element with a charging policy to be enforced at said network element for charging of data reaching said network element of a communication network during a data session.

This will be explained in greater detail with reference to FIG. 1. FIG. 1 shows in schematic outline the charging mediation functionality CMF and involved functionalities/steps involved in the method for supplying a network element with a charging policy to be enforced at said network element for charging of data reaching said network element of a communication network during a data session.

As shown in FIG. 1, the charging mediation functionality CMF comprises a policy management interface functionality. This policy management interface is adapted to create charging policies. The creation is based on an operator input as well as on input flow definitions. A flow definition defines a flow of data, which are packet data. Thus, properties of the packets define a flow in that all packets having the same properties belong to the same flow. A property of a packet and/or flow is also referred to as attribute.

Among the items input as operator input there are at least one of a charging/accounting type, an accounting event trigger, a charging metrics, and a tariffing indication, which is/are mapped and/or assigned to a corresponding flow distinguished from other flows by a set of packet flow attributes. For example, charging/accounting type is defined by an indication whether online accounting (prepaid, hot billing) or offline accounting is to be effected. As accounting event triggers are possible (either one or several in combination): QoS changes, tariff changes, time thresholds and/or volume thresholds. Charging metrics include a volume metering (which is On/Off), a time metering (which is On/Off), a QoS metering (which is On/Off) (either one or several in combination). Further, tariffing comprises an indication of the tariff class and a co-assigned value of the tariff.

The above input is supplied by the operator, e.g. "manually" or as a preconfigured file.

As regards properties of the packets defining a flow, these properties may also be input by the operator as the above items. Nevertheless, the properties may also be supplied as a result obtained at an observation point or measurement device monitoring data flows or directly by an application. Irrespective of whether input manually or as a result of a measurement or by an application, the properties/attributes of the packets defining a flow may comprise for example source address and port; destination address and port; Layer 3 Protocols used (Network protocols); TOS (IPv4 Type Of Service); Traffic Class (IPv6); Flow Identifier; URL (if needed); Destination Classification such as internal/partner/external (e.g. "Sonera", partner or external).

To each set of attributes/properties of a flow is mapped a corresponding set of operator specified input items listed above to thereby define a charging policy for the respective flow.

Thus, at the output of the policy management interface as plurality of charging policies and/or charging rules is defined, which serve as an input to a charging policy decision/selection functionality. At the selection functionality, a charging policy is selected out of said plurality of policies. The selection is based on information on offered services as well as information on relevant subscribers also supplied to the selection functionality. The information related to offered services is provided by the network operator, e.g. upon network configuration, while information on relevant subscribers can be obtained e.g. from subscriber databases such as the home subscriber server HSS or the like.

At the output of the selection functionality, one charging policy is then present which is distributed via a charging policy control functionality to one or more network elements. The charging policy thus selected may for example be selected for a specific network element type such as an access network element (e.g. GGSN) or a core network element (e.g. Application server APS or Call Processing server CPS (sometimes also denoted as Connection Processing Server)). Then, the selected charging policy can be distributed to all network elements of the same type concerned.

The above description has mainly be given with regard to the parameters used in connection with access network elements, while in case of core network elements, at least the following parameters as an example could at least be part of a charging policy delivered to the core network elements (in addition or alternatively to those mentioned above in connection with access network elements): charging/accounting type (online accounting (prepaid, hot billing), off-line accounting), accounting event triggers (URL, time change, service class change, add/remove media component, Session Initiated Protocol SIP Method 1 with list of messages, SIP Method n with list of messages), charging metrics (content size (On/Off), time metering (On/Off), number of transactions (On/Off), tariffing (tariff class and value).

Charging policies could be enforced to core network elements such as CPS to indicate which event, sequence of events or actions could trigger accounting actions.

Thus, with regard to the method for supplying a network element with a charging policy to be enforced at said network element for charging of data reaching said network element of a communication network during a data session, the foregoing made clear that the method comprises the steps of creating a plurality of charging policies, each comprising at least one flow parameter, and at least one of a charging/accounting type, an accounting event trigger, a charging metrics, and a tariffing indication, selecting a charging policy based on offered services and subscriber information, and distributing said selected charging policy to at least one network element.

Also, a respective charging policy is for example selected for a type of a network element and distributed to all network elements of said specific type. In case of access network elements such as GGSN, enforced charging policies for Access Network Devices such as GGSN define the triggering detection points for a chargeable flow.

Figure 2:
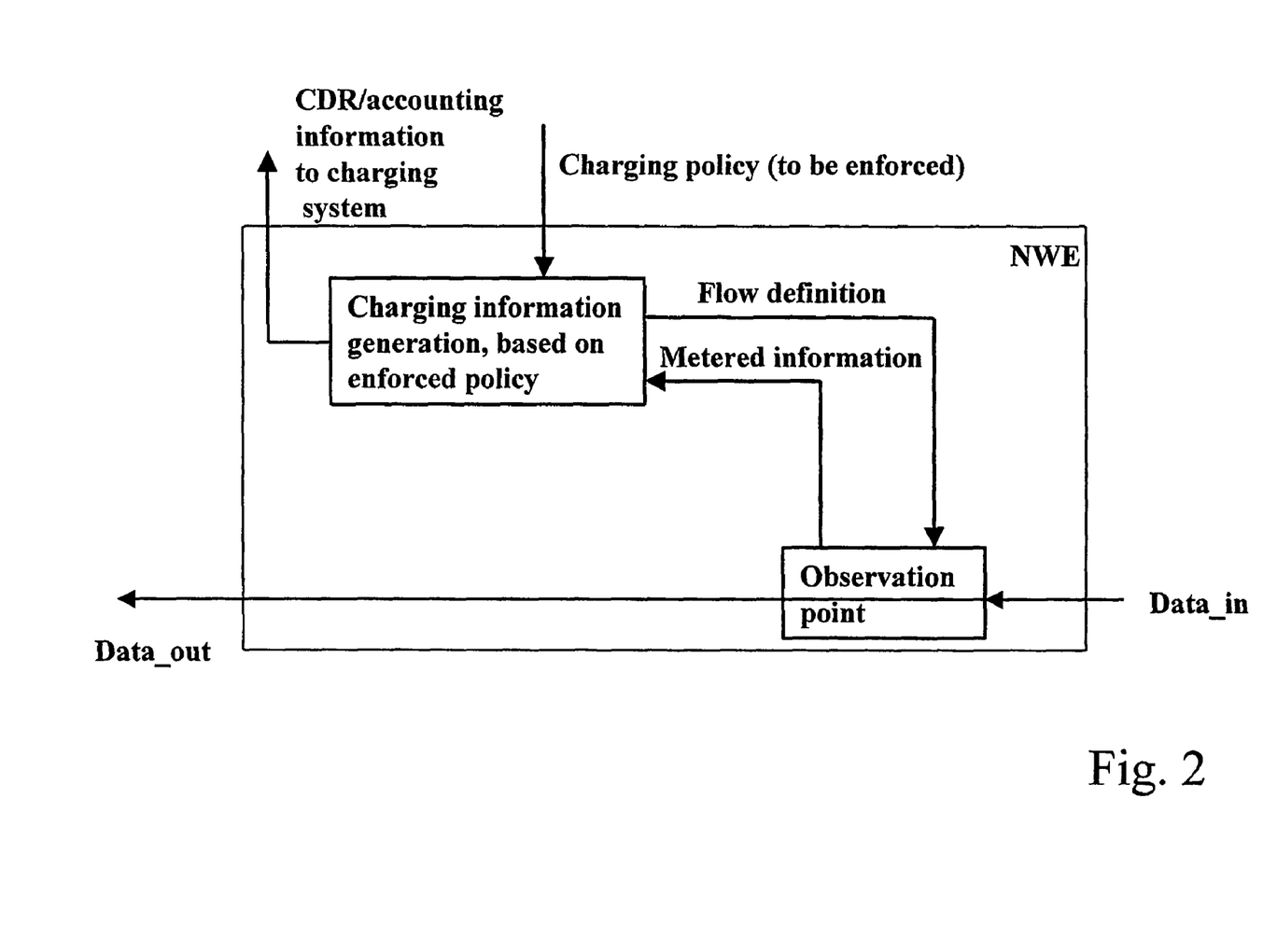
FIG. 2 shows in schematic outline the functionalities and steps involved in the method for charging of data reaching a network element of a communication network during a data session.

FIG. 2 shows in schematic outline the functionalities and steps involved in the method for charging of data reaching a network element of a communication network during a data session.

As shown, data reaching a network element (data_in) pass through an observation point (here illustrated to be located in the network element). An observation point is a measurement equipment located in the network at which data packets such as IP based packets can be observed and their properties can be determined. Examples are a line to which a probe is attached, a shared medium such as an Ethernet based Local Area Network LAN, a single port of a router or a set of interfaces (physical or logical) of a router. As a result of the flow or flows being observed at the observation point, a flow record (per flow) is obtained. A flow record contains information about a specific flow that was metered at the observation point, and more particularly, contains measure properties of the flow such as the total number of bytes of all packets of the flow and usually characteristic properties of the flow such as an IP source address. A plurality of flows are also referred to as a session. Such a session may for example be a PDP context (PDP: Packet Data Protocol) or any other logical context.

Stated in other words, the observation point yields information on flow definitions of the flows contained in the current session, the data of which are passing through the observation point.

These information on the flows, i.e. the flow records of the individual flows are forwarded to a charging information generation entity. At the charging information generation entity, the charging policies received from the charging mediation functionality are enforced, i.e. rendered valid for charging purposes. Thus, based on the enforced charging policy at the network element and the observed flow parameters (metered information), charging information is generated and forwarded, e.g. as a call detail record CDR (also referred to as a Charging Data record) or as a RADIUS/DIAMETER accounting information (Remote Authentication Dial In User Service (RADIUS)), to a charging system of the network.

Stated in other words, the present invention concerning a method for charging of data reaching a network element of a communication network during a data session, the data session comprising a plurality of data flows, with each flow being distinguishable by a set of flow parameters, comprises the steps of enforcing a charging policy at the network element to be applied to said data, wherein said charging policy defines charging rules per flow; observing said data reaching said network element and detecting at least one flow of data; and matching said detected flow of data to an enforced charging policy, and applying said matching charging policy to said flow, thereby generating charging information.

Of course, there is also conceived a forwarding of said generated charging information to a charging system of the communication network.

The charging policy for access network devices defines, in case of an IP flow as an example of a flow of a session such as a PDP context, the IP flow specification that must be distinguished upon being measured as well as the relevant accounting action to be taken upon being distinguished. A charging policy can for example suppress accounting/charging for the distinguished data flow and assign a tariff class 0.

Enforcement of charging policies to access network devices such as GGSN can be realized during start up or upon session, i.e. PDP context activation. In addition, charging policies can be enforced to access network devices such as a GGSN dynamically during the context lifetime. When a charging policy is enforced to the access network device, it initiates the creation of volume and/or time counters. Such counters are initiated upon receiving the charging policy and appropriate accounting actions are triggered as specified within the charging policy. Charging policy enforced to GGSN in principle remains active only during the lifetime of the context. However, in certain cases, it is possible to maintain charging policies active within the access network device regardless of the context lifetime. Such charging policies apply for services independently of the subscriber base. Furthermore, application level information carried as payload within the IP packets such as URL specification can be needed as parameters in order to distinguish the IP Flow. In particular, there are several occasions on which the information at Layer 2/Layer 3 is not enough to distinguish the appropriate IP Flow, and in which cases the application level information will additionally be referred to for unambiguously distinguishing the flows (at least one) which correspond to the use of the application or service.

Thus, summing up the above, as regards the enforcing, this is performed upon start-up of the network element, while enforcing may also be performed upon activation of the data session (such as a PDP context). Considering an active session, enforcing may also be performed dynamically during the life-time of the data session.

It is further to be understood that upon enforcing said charging policy, data volume counters and/or time counters are initialized at the network element, more specifically, at the charging information generation functionality. Even though said data flows are not restricted to Internet Protocol based packet data flows, and in case of IP based data flows, said flow parameters comprise at least one of an IP header field, a transport header field, and an application level information.

More particularly, as regards the flow parameters to be observed, concerning
  IP Header Fields, the measuring device is capable of separating the flows by the following fields of the IP header as indicated: Source IP address, Destination IP address, Transport protocol type (Layer 4 protocol type), IP version number, TOS (IPv4 Type of Service), Traffic Class (IPv6);
  Transport Header Fields, the measuring device is capable of separating flows by the port numbers of the transport header in case of Transmission Control Protocol TCP or User Datagram Protocol UDP being used as transport protocol. Both source and destination port number are supported for distinguishing flows, individually as well as in combination;
  application level information carried as payload within the data packets (e.g. URL), this information can also be used as parameter to distinguish data flows (at least one data flow).

An enforced charging policy comprises, as stated further above at least one flow parameter as mentioned above, and at least one of a charging/accounting type, an accounting event trigger, a charging metrics, and a tariffing indication (explained above).

Even though herein above the present invention has been described with a focus on the method aspect, it is of course to be understood that the invention also concerns corresponding devices.

Figure 3:
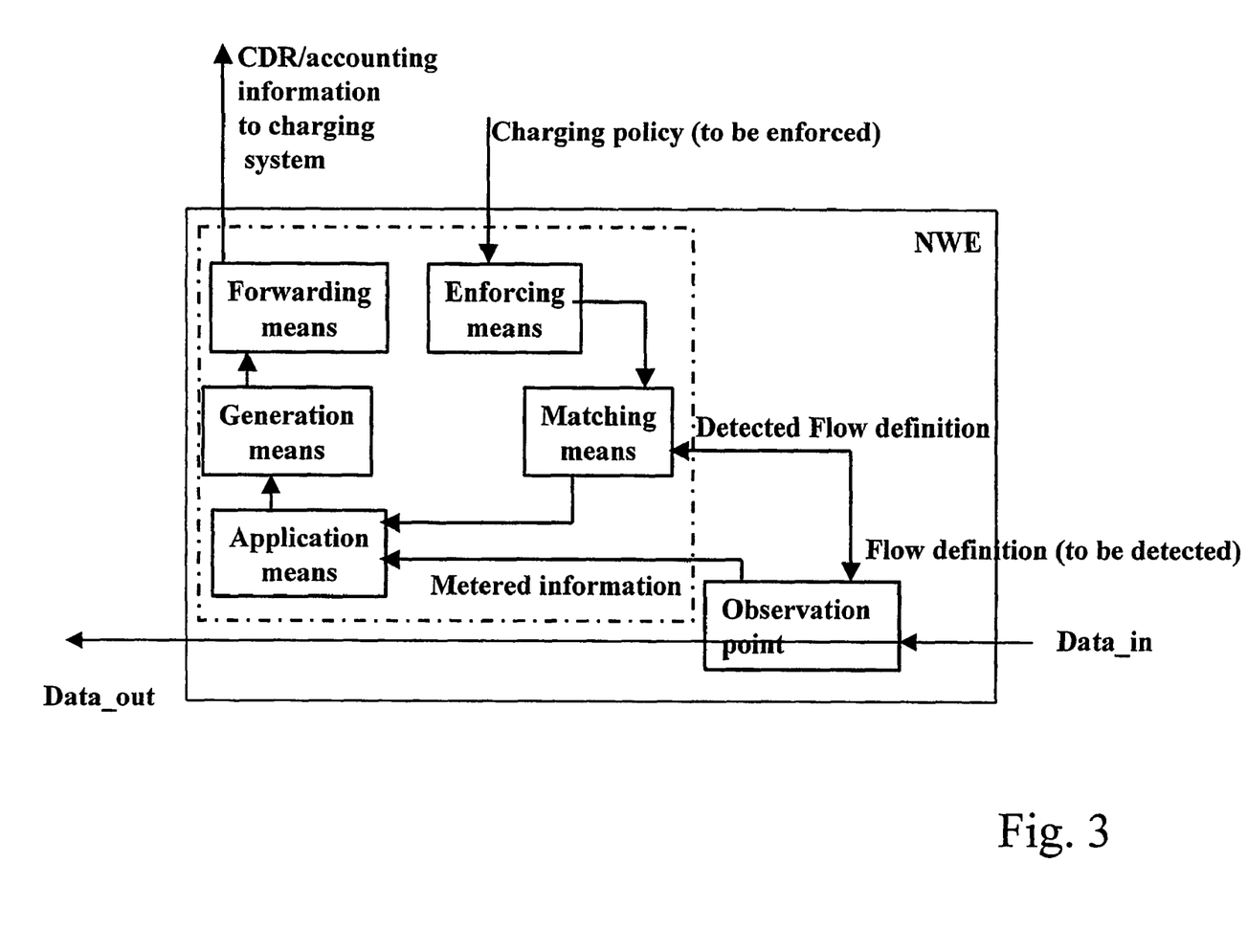
FIG. 3 shows details of a device for charging of data reaching a network element of a communication network during a data session.

FIG. 3 shows details of such a device, labeled in FIG. 2 merely as "charging information generation, based on enforced policy", which are surrounded in FIG. 3 by a dashed line.

Thus, the device for charging of data reaching a network element of a communication network during a data session, the data session comprising a plurality of data flows, with each flow being distinguishable by a set of flow parameters, comprises enforcing means adapted to enforce a charging policy at the network element to be applied to said data, wherein said charging policy defines charging rules per flow. The policy/policies is/are received from outside, e.g. from a device for supplying a network element with a charging policy to be enforced and as described later on.

Furthermore, an observation means is provided which is adapted to observe said data reaching said network element and detecting at least one flow of data. The observation means may be part of the device for charging or considered as a separate unit, while however it is in cooperation with the device for charging if considered separate.

In addition, the device comprises a matching means adapted to match said detected flow of data to an enforced charging policy, and application means adapted to apply said matching charging policy to said flow, and still further generation means, responsive to said application means, adapted to generate charging information.

The charging policy is received at the enforcing means where it is rendered valid to be enforced and e.g. buffered in a memory (not shown). The enforcing means informs the matching means of the policy. The matching means in turn supplies a flow definition (to be detected) to the observation means, which returns information on detected flow definitions to the matching means. In case the flow definitions (the detected and the one to be detected) are matching (identical), the matching means triggers the application means to apply the enforced policy to metered information received from the observation means. The application means then forwards the available information to the generation means where the charging information as such is generated.

In addition, as shown in FIG. 3, the device further comprises forwarding means adapted to forward said generated charging information from the generation means to a charging system of the communication network.

Similarly as explained in connection with the corresponding method, said enforcing means are responsive to a start-up of the network element to perform the enforcing, or said enforcing means are responsive to activation of the data session to perform the enforcing, or said enforcing means are dynamically performing the enforcing during the life-time of the data session.

Also, the device further comprises initialization means (not shown) which are adapted to initialize data volume counters and/or time counters responsive to enforcing said charging policy.

Like in connection with the explanations of the method further above, Said data flows are Internet Protocol based packet data flows, and said flow parameters comprise at least one of an IP header field, a transport header field, and an application level information. Said charging policy comprises at least one flow parameter, and at least one of a charging/accounting type, an accounting event trigger, a charging metrics, and a tariffing indication.

Also, even though not shown in detail in the Figures, but as outlined in FIG. 1, the present invention concerns a device for supplying a network element with a charging policy to be enforced at said network element for charging of data reaching said network element of a communication network during a data session, the device comprising creation means adapted to create a plurality of charging policies, each comprising at least one flow parameter, and at least one of a charging/accounting type, an accounting event trigger, a charging metrics, and a tariffing indication, selection means adapted to select a charging policy based on offered services and subscriber information, and distribution means adapted to distribute said selected charging policy to at least one network element. A charging policy is selected for a type of a network element.

Accordingly, as has been described herein before, the present invention proposes a method for charging of data reaching a network element of a communication network during a data session, the data session comprising a plurality of data flows, with each flow being distinguishable by a set of flow parameters, the method comprising the steps of: enforcing a charging policy at the network element to be applied to said data, wherein said charging policy defines charging rules per flow; observing said data reaching said network element and detecting at least one flow of data; and matching said detected flow of data to an enforced charging policy, applying said matching charging policy to said flow, thereby generating charging information. Also, the present invention concerns a method for supplying a network element with a charging policy to be enforced at said network element for charging of data reaching said network element of a communication network during a data session. Additionally, corresponding devices are concerned by the present invention.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

LIST OF REFERENCE SIGNS USED IN FIG. 1

IN1:
Operator input (e.g. at least one of charging/accounting type, an accounting event trigger, a charging metrics, and a tariffing indication)
IN2:
Flow definitions (packet properties), e.g. from observation point or application
P1:
policies
IN3:
Information on offered services (e.g. defined by operator)
IN4:
Information on subscribers (e.g. from HSS)
P2:
Selected policy (e.g. per network element type)
P3:
Selected policy distributed to network elements such as of type "GGSN"
I/F: Interface
CMF: charging mediation functionality

The invention claimed is:

1. A method, comprising:
selecting a charging policy based on offered services, subscriber information, and a network element type that the selected charging policy will be enforced against;
causing the selected charging policy to be distributed to a network element of the network element type, wherein the charging policy is to be enforced at the network element for charging of data reaching the network element during a packet data protocol context;
enforcing the charging policy at the network element, wherein the charging policy is applied to a data flow of data packets reaching the network element during the packet data protocol context, the packet data protocol context comprising a plurality of data flows including the data flow, wherein each data flow of the plurality of data flows is distinguishable by a set of flow parameters, wherein the set of flow parameters includes a flow identifier that distinguishes flows having a common destination address, source address, source port, destination address, destination port, and a protocol and wherein said charging policy defines charging rules for the data flow;
observing the data packets reaching said network element;
detecting the data flow from flow parameters included in the data packets, wherein the flow parameters indicate the charging policy to be enforced on the data flow;
mapping the data packets to the data flow in accordance with the at least one flow parameter included in a respective data packet;
matching the data flow to the charging policy; and
applying said charging policy to said data flow to generate charging information.

2. The method according to claim 1, further comprising:
causing the generated charging information to be forwarded to a charging system of a communication network.

3. The method according to claim 1, wherein the enforcing is performed upon start-up of the network element.

4. The method according to claim 1, wherein the enforcing is performed upon activation of the packet data protocol context.

5. The method according to claim 4, wherein the enforcing is performed dynamically during a life-time of the packet data protocol context.

6. The method according to claim 1, further comprising:
initializing data volume counters upon enforcing said charging policy.

7. The method according to claim 1, wherein said plurality of data flows of the packet data protocol context are Internet Protocol (IP) based packet data flows, and said flow parameters further comprise, in addition to the flow identifier, a source address, a source port, a destination address, a destination port, a protocol, and at least one of an IP header field, a transport header field, and an application level information.

8. The method according to claim 1, wherein said charging policy comprises at least one flow parameter, and at least one of a charging/accounting type, an accounting event trigger, a charging metrics, and a tariffing indication.

9. The method according to claim 1, further comprising:
creating a plurality of charging policies including the charging policy to be enforced, each charging policy of the plurality of charging policies comprising at least the one flow parameter, and at least one of a charging/accounting type, an accounting event trigger, a charging metrics, and a tariffing indication.

10. An apparatus comprising a processor configured to cause the apparatus to:
select a charging policy based on offered services, subscriber information, and a network element type that the selected charging policy will be enforced against;

cause the selected charging policy to be distributed to a network element of the network element type, wherein the charging policy is to be enforced at the network element for charging of data reaching the network element during a packet data protocol context;

enforce the charging policy at the network element, wherein the charging policy is applied to a data flow of data packets reaching the network element during the packet data protocol context, the packet data protocol context comprising a plurality of data flows including the data flow, wherein each data flow of the plurality of data flows is distinguishable by a set of flow parameters, wherein the set of flow parameters includes a flow identifier that distinguishes flows having a common destination address, source address, source port, destination address, destination port, and a protocol and wherein said charging policy defines charging rules per data flow of the plurality of data flows;

observe said data packets reaching said network element;

detect the data flow from flow parameters included in the data packets, wherein the flow parameters indicate the charging policy to be enforced on the data flow;

map the data packets to the data flow in accordance with the at least one flow parameter included in a respective data packet;

match the data flow to the charging policy;

apply said charging policy to said data flows; and generate charging information, in response to applying said charging policy.

11. The apparatus according to claim 10, wherein the processor is further configured to cause the apparatus to cause the generated charging information to be forwarded to a charging system of a communication network.

12. The apparatus according to claim 10, wherein the processor is further configured to cause the apparatus to be responsive to a start-up of the network element to perform the enforcing.

13. The apparatus according to claim 10, wherein the processor is further configured to cause the apparatus to be responsive to activation of the packet data protocol context to perform the enforcing.

14. The apparatus according to claim 13, wherein the processor configured to cause the apparatus to enforce the charging policy is further configured to cause the apparatus to dynamically enforce during a life-time of the packet data protocol context.

15. The apparatus according to claim 10, wherein the processor is further configured to cause the apparatus to initialize data volume counters and/or time counters responsive to enforcing said charging policy.

16. The apparatus according to claim 10, wherein said plurality of data flows of the packet data protocol context are Internet Protocol (IP) based packet data flows, and said flow parameters further comprise, in addition to the flow identifier, a source address, a source port, a destination address, a destination port, a protocol, and at least one of an IP header field, a transport header field, and an application level information.

17. The apparatus according to claim 10, wherein said charging policy comprises at least one flow parameter, and at least one of a charging/accounting type, an accounting event trigger, a charging metrics, and a tariffing indication.

18. The apparatus of claim 10, wherein the processor is further configured to cause the apparatus to:

create a plurality of charging policies including the charging policy to be enforced, each charging policy of the plurality of charging policies comprising at least the one flow parameter, and at least one of a charging/accounting type, an accounting event trigger, a charging metrics, and a tariffing indication.

19. An apparatus, comprising:

means for selecting a charging policy based on offered services, subscriber information, and a network element type that the selected charging policy will be enforced against;

means for causing the selected charging policy to be distributed to a network element of the network element type, wherein the charging policy is to be enforced at the network element for charging of data reaching the network element during a packet data protocol context;

enforcing means configured to enforce a charging policy at a network element, wherein the charging policy is to be applied to a data flow of data packets reaching the network element during a packet data protocol context, the packet data protocol context comprising a plurality of data flows including the data flow, wherein each data flow of the plurality of data flows is distinguishable by a set of flow parameters, wherein the set of flow parameters includes a flow identifier that distinguishes flows having a common destination address, source address, source port, destination address, destination port, and a protocol and wherein said charging policy defines charging rules for the data flow;

observation means configured to observe said data packets reaching said network element;

detecting means configured to detect the data flow from flow parameters included in the data packets, wherein the flow parameters indicate the charging policy to be enforced on the data flow;

mapping means configured to map each of the data packets to the data flow in accordance with the at least one flow parameter included in a respective data packet;

matching means configured to match said data flows to the charging policy;

application means configured to apply said charging policy to said data flow; and generation means, responsive to said application means, configured to generate charging information.

20. The method according to claim 1, wherein observing the data packets includes observing the data packets reaching said network element, the data packets including the at least one flow parameter, the at least one flow parameter including the flow identifier and the destination address, wherein the flow identifier does not include the destination address.

21. The apparatus according to claim 10, wherein the processor configured to cause the apparatus to observe the data packets includes being configured to cause the apparatus to observe the data packets reaching said network element, the data packets including the at least one flow parameter, the at least one flow parameter including the flow identifier and the destination address, wherein the flow identifier does not include the destination address.

22. The apparatus according to claim 19, wherein the observation means configured to observe the data packets includes being configured to observe the data packets reaching said network element, the data packets including the at least one flow parameter, the at least one flow parameter including the flow identifier and the destination address, wherein the flow identifier does not include the destination address.

23. The method according to claim 1, further comprising:

selecting the charging policy based on the at least one flow parameter, including the flow identifier, of the data packets; and metering of the data packets of the data flow to generate a flow record comprising information about the data flow;

wherein applying said charging policy includes applying said charging policy to the flow record to generate the charging information for the data flow.

24. The apparatus according to claim 10, wherein the processor is further configured to cause the apparatus to:

select the charging policy based on the at least one flow parameter, including the flow identifier, of the data packets; and meter the data packets of the data flow to generate a flow record comprising information about the data flow; and wherein the processor configured to cause the apparatus to apply said charging policy includes being configured to cause the apparatus to apply said charging policy to the flow record to generate the charging information for the data flow.

25. The apparatus according to claim 19, further comprising:

means for selecting the charging policy based on the at least one flow parameter, including the flow identifier, of the data packets; and means for metering of the data packets of the data flow to generate a flow record comprising information about the data flow;

wherein the application means configured to apply said charging policy includes being configured to apply said charging policy to the flow record to generate the charging information for the data flow.

* * * * *